United States Patent [19]
Drynan

[11] 3,991,983
[45] Nov. 16, 1976

[54] BLENDER
[76] Inventor: Anthony Augustus Drynan, P.O. Box 52, Rivonia 2128, South Africa
[22] Filed: Aug. 5, 1974
[21] Appl. No.: 495,062

[30] Foreign Application Priority Data
Aug. 17, 1973 South Africa............... 73/5688

[52] U.S. Cl. ................................. 259/182
[51] Int. Cl.² .................... B01F 3/00; B01F 11/00
[58] Field of Search............. 259/182, 99, DIG. 28, 259/DIG. 29, DIG. 25, DIG. 45

[56] References Cited
UNITED STATES PATENTS

| 454,194 | 6/1891 | Wilkinson .................... 259/99 X |
| 461,892 | 10/1891 | Ruthrauff ....................... 259/99 |
| 874,270 | 12/1907 | Wehele ....................... 259/182 X |
| 2,013,902 | 9/1935 | Tarrant .......................... 259/182 X |
| 2,092,353 | 9/1937 | Kyseth et al. ............... 259/DIG. 45 |

FOREIGN PATENTS OR APPLICATIONS

| 11,264 | 11/1909 | France .............................. 259/139 |
| 518,296 | 2/1931 | Germany ..................... 259/DIG. 45 |

Primary Examiner—Edward L. Roberts
Assistant Examiner—Donald B. Massenberg
Attorney, Agent, or Firm—Karl W. Flocks

[57] ABSTRACT

Blender for use in blending a medium. Comprising of a body having a multiplicity of angularly related prongs set in a hollow circle, having along their length plane surfaces and sharpened edge zones, and being resiliently flexible.

6 Claims, 3 Drawing Figures

BLENDER

This invention relates to a blender for use in blending a medium. More particularly, this invention relates to a blender for use in blending or mixing a medium comprising a material, a material having different consistencies, different materials, different materials having different consistencies, and the like. The materials may be in the form of a liquid or liquids, powders or granules, or a liquid or liquids and powder or granules.

According to the invention there is provided a blender for use in blending a medium, comprising a body portion and a multiplicity of prongs extending from the body portion, the prongs having at least their free end portions spaced from each other, and the prongs being resiliently flexible to cause them to vibrate during use in a medium being blended.

The prongs may conveniently be arranged so that they are spaced from each other along their entire lengths.

Since the prongs are resiliently flexible and have at least their free end portions spaced from each other, the prongs will, during use, be flexed and displaced. They will therefore tend to vibrate.

Thus, displacement of the blender through a medium being blended, gives rise to blending vibrations of the prongs.

The vibrations of the individual prongs will tend to vary depending upon the depth to which they are submerged in the medium being blended, the consistency of the medium being blended at spaced zones in the medium, the direction of movement of the blender, and the influence of a vibrating prong and the disturbance which it causes in the medium being blended, on adjacent prongs.

Vibration of the individual prongs will therefore tend to be independent thereby increasing the blending effect which would be provided by displacement of the blender alone through the medium being blended.

Each prong may conveniently have at least one plane face portion to influence its resistance to displacement through a medium being blended, during use.

Each plane face portion may therefore when extending transversely to the direction of movement of the blender, result in a greater deflection of the prong. Furthermore, it would tend to provide an impact surface to disturb the medium being blended, disturb lumps in the medium being blended, and compress the medium being blended against the sides of a vessel in which it is contained, or the like.

Where the plane face portion extends at an acute angle to the direction of movement of the blender, the prong would tend to be displaced laterally of the direction of movement, thereby varying vibration of the prong.

In an embodiment of the invention, each prong may have at least one sharpened edge zone along portion of its length.

A sharpened edge zone would tend to penetrate lumps or obstructions in the medium being blended. It would further tend to cause lateral displacement of the prong in relation to the direction of movement, depending upon its positioning. It would therefore tend to vary vibration of the prong.

Conveniently, each prong may have a plurality of plane faces along its length, and/or a plurality of sharpened edge zones.

Each prong may therefore be of triangular cross-section, rectangular cross-section, polygonal cross-section, semi-circular cross-section, or the like.

It will be appreciated that the prongs may have the same cross-section, or differing cross-sections, as desired. Where the cross-sections are different, vibration of the individual prongs during use will tend to vary.

The blender may conveniently have the prongs arranged with their corresponding surface areas in non-corresponding orientation to provide differing displacement characteristics for the prongs during use in a medium being blended.

This arrangement would tend to cause vibration of different prongs to different extents during use thereby amplifying the blending effect of the blender.

At least some of the prongs may conveniently have their cross-sectional areas decreasing from the body portion of the blender towards their free end portions. This would tend to provide greater resilient flexibility of the free end portions of the prongs.

Conveniently, the width of the prongs may remain constant along their length, with their thicknesses decreasing towards their free end portions.

In an embodiment of the invention, at least some of the prongs may be in the form of angular prongs, with each angular prong comprising two angularly related prong portions.

In an embodiment of the invention, each angular prong may have the cross-sectional area of its angularly related prong portions increasing gradually to a maximum at their junction.

During use of the blender, the angular prongs will tend to vibrate relatively to the body portion. In addition, the angularly related prong portion which is remote from the body portion, can tend to vibrate relatively to the angularly related prong portion which is adjacent the body portion, about their junction. The free end portion of the angularly related prong will therefore tend to move towards and away from the body portion during use thereby giving rise to a further form of movement and thus vibration during use.

The prongs may be arranged in any desired configuration. Thus, for example, the prongs may be arranged so that they extend substantially parallel to each other, so that they diverge away from each other towards their free end portions, so that they generally converge towards each other towards their free end portions, or the like.

In an embodiment of the invention, the prongs may be arranged about the polar axis of the blender to define a hollow internal core between at least their free end portions.

In this embodiment of the invention, displacement of the blender through a medium being blended, will tend to cause the medium to be strained between adjacent prongs into the hollow core region and between the prongs out of the hollow core region.

The body portion of the blender may be adapted to transfer vibrations from one prong to at least one other prong.

The body portion may therefore be of a resiliently flexible material. In an embodiment of the invention, the body portion may be tubular and of a resiliently flexible material with the prongs extending integrally therefrom.

In this embodiment of the invention, vibration of each prong will be transmitted to at least some other prongs through the body portion thereby increasing the vibration of the prongs upon displacement of the blender through a medium being blended.

The body portion may conveniently be shaped to fit snugly into the hand of a person for use.

The body portion may conveniently be shaped so that it can readily be held without undue contact with the body portion adjacent the prongs, and without contact with the prongs. Thereby damping of the vibration of the prongs will tend to be reduced.

The body portion of the blender may have, or may be adapted to receive, an enlarged locating portion to assist in locating the body portion in the hand of a person. The enlarged locating portion may further provide a shoulder onto which hand pressure can be applied for forcing the blender into a medium being blended.

The locating portion may conveniently include a spigot formation which is adapted to be engaged in a bore of the body portion. The spigot formation may conveniently be a force fit, a friction fit, or the like in the bore of the body portion.

The locating portion may conveniently have a bore.

In an embodiment of the invention, the blender may be adapted to be engaged with a mechanical blender apparatus for mechanically driving the blender during use.

The mechanical blender apparatus may be of any conventional type having a socket formation for removably receiving a spigot formation.

The blender may have a tapered bore formation in the body portion, for receiving a tapered spigot which is adapted to be engaged with a bore or the like of a mechanical blender apparatus.

The prongs of the blender may be of any suitable length in relation to the length of the body portion. The length of the prongs may conveniently be arranged to allow convenient handling of the blender, and to provide effective vibration of the prongs during use for the material and cross-sectional configurations of the prongs.

In an embodiment of the invention, the prongs may have a length of about two to three times that of the body portion.

The prongs may have a length in relation to their width, to provide a desired vibration of the prongs for the type of material out of which they are made.

In an embodiment of the invention, for example, each prong may have a length of between about thirty to fifty times its width.

The blender of this invention may be made of any suitable material.

Thus, for example, it may conveniently be moulded out of a suitable synethetic plastic material.

Thus, for example, the blender may be moulded out of nylon, high density polyethylene, or the like.

Where the blender is moulded out of nylon, a balance betweeen efficacy and economics, would probably result in the use of an intermediate density nylon. However, if desired, a low density nylon may be used. Alternatively, if desired, a high density nylon or a fibrous nylon could be used.

High density or fibrous nylon would tend to provide a high degree of resiliency and thus rapid vibration of the prongs during use.

An embodiment of the invention is now described by way of example with reference to the accompanying drawings.

Figures 1, 2:
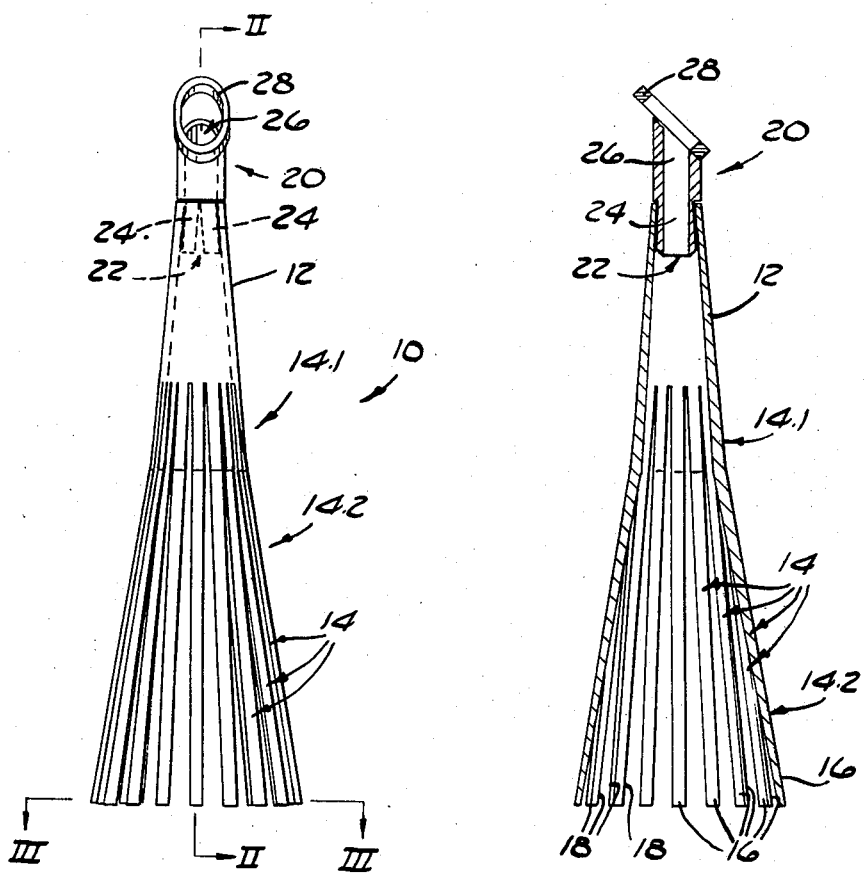
FIG. 1 shows a front elevation of a blender for use in blending a medium.
FIG. 2 shows a sectional side elevation along line II—II in FIG. 1.

With reference to the drawings, reference numeral 10 refers generally to a blender for use in blending a medium, comprising a body portion 12 and a multiplicity of prongs 14 extending from the body portion 12.

The prongs 14 are integrally moulded with the body portion 12, out of an intermediate density, food quality nylon.

The prongs 14 are resiliently flexible to cause them to vibrate during use in a medium being blended.

Figure 3:
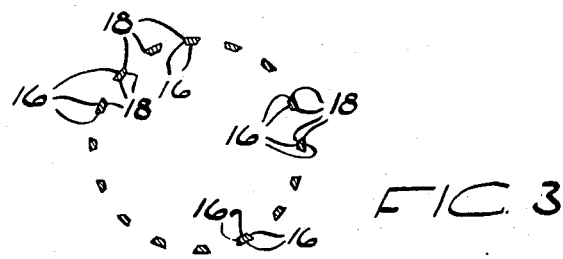
FIG. 3 shows a sectional plan view along line III—III in FIG. 1.

Each prong 14 is of substantially truncated pyramidal cross-section (as can be seen in particular in FIG. 3 of the drawings). Each prong 14 therefore has four plane face portions 16 and four sharpened edge zones 18 along its length.

Each prong 14 is in the form of an angular prong, comprising two angularly related prong portions 14.1 and 14.2.

Each angular prong portion 14.1 extends from the body portion 12, and each angular prong portion 14.2 extends from an angular prong portion 14.1, but at a great angle to the polar axis of the blender 10.

Each prong 14 is of constant width but of non-constant thickness.

Thus, as can be seen in the drawings, each prong 14 has its maximum thickness at the junction of the angularly related prong portions 14.1 and 14.2. From there, both angularly related prong portions 14.1 and 14.2 gradually decrease in thickness towards the body portion 12 on the one hand, and towards the free end portion of the prong 14 on the other hand.

The blender 10 is generally in the form of a truncated hollow cone. The body portion 12 thus is tubular and tapers outwardly towards the prongs 14, and the prongs 14 extend outwardly from the body portion 12, diverging outwardly relatively to each other and relatively to the polar axis of the blender 10, towards their free end portions. A hollow tapered core is thus defined within the blender 10.

As can be seen in particular in FIG. 3 of the drawings, the prongs 14 are thus arranged at spaced intervals along the circumference of a circle.

The body portion 12 is resiliently flexible since it is in the form of a relatively thin walled body portion, with the thickness of the walls decreasing gradually the further they are away from the prongs 14.

The body portion 12 is shaped to fit snugly into the hand of a person for use in blending a material.

The blender 10 includes an enlarged locating portion 20 to locate the blender 10 in a person's hand during use, and provide a shoulder onto which hand pressure can be applied for forcing the blender 10 into a medium to be blended.

The enlarged locating portion 20 includes a spigot formation 22 which is a friction fit within the tapered bore of the body portion 12.

The spigot formation 22 comprises two outwardly biassed portions 24 which locate the spigot formation 22 within the bore of the handle portion 12.

The enlarged locating portion 20 has a bore 26 extending therethrough. If further has a ring formation 28 which may be used for hanging the blender 10 from a hook. The ring formation 28 further provides a shoulder onto which hand pressure can be applied by means of the palm of a hand to force the blender 10 into a medium being blended.

The blender 10 as illustrated in the drawings, may conveniently have a length of about 230 mm. The prongs may thus conveniently have a length of about 150 mm, and the body portion a length of about 50 mm.

The body portion 12 may conveniently have a wall thickness of about 1 mm at its end which is remote from the prongs 14 and the prongs 14 may have a width of about 3 to 4 mm, and a thickness of about 2 mm at their free end portions, and about 4 mm at the junction of the angularly related portions 14.1 and 14.2.

It will be appreciated however that the size and relative sizes may be varied as desired.

In use, the blender 10 may be gripped in the hand of a person and may then be inserted into a medium to be blended.

The blender 10 may then be displaced through the medium to be blended in a appropriate manner depending upon whether the blending comprises mixing, smoothing blending, whipping or the like.

During displacement of the blender 10 through the medium, the prongs 14 will be flexed and displaced and will thus, by virtue of their resilient flexibility, vibrate during use. Since the body portion 12 is resiliently flexible, vibration of the prongs 14 will cause vibration of the body portion 12. Such vibration of any prong 14 will thus be transmitted through the body portion 12 to cause vibration of one or more other prongs 14.

Since the prongs 14 are arranged about the polar axis of the blender 10, with their corresponding surface areas directed towards the polar axis, it will be appreciated that different surface areas of the prongs 14 will be influenced to different extents by displacement of the blender 10 in one direction through a medium being blended. Thus, for example, a prong 14 having a large plane face 16 directed normally to the direction of movement, will tend to be displaced the most during use and will tend to exert the greatest force on the medium being blended. Other prongs 14 will tend to be displaced laterally to the direction of movement since their main plane face portions 16 extend transversely to the direction of movement. It will be appreciated therefore that the vibration of the various prongs 14 will therefore tend to vary from prong to prong thereby causing independent vibration of the individual prongs.

The independent vibrations of the individual prongs will cause complex vibrations in the body portion 12, which are again transferred to prongs to influence their vibration.

It will further be appreciated that, depending upon the direction of the sharpened edge zones 18 of the prongs 14, the displacement of the prongs 14 during use will again vary.

In addition, the disturbance caused by each individual prong in the medium being blended, will tend to interfere with the vibration of the adjacent prongs.

It will be appreciated therefore that during displacement of the blender 10 through a medium to be blended, the blending effect will be enhanced by the independent vibration of the multiplicity of prongs 14.

If the plane face portions 16 or the sharpened edge zones 18 come into contact with lumps, obstructions or the like, they would tend to break them up or cut into them rather than slide passed them as would be the case for prongs of circular of the like cross-section. The particular cross-sectional configuration of the prongs as illustrated in the drawings, would therefore tend to be more effective than prongs of circular cross-section.

It is therefore an advantage of the embodiment of the invention as illustrated in the drawings, that it will blend a medium efficiently in view of the multiplicity of blending vibrations which are produced in the blender 10 as a whole during use, and in the individual prongs during use.

It will further be appreciated that where, as shown in the drawings, each prong comprises two angularly related prong portions 14.1 and 14.2, and displacement of the blender 10 through a medium to be blended occurs, the prongs 14 along the leading zone of the blender 10 would tend to have their free end portions displaced downwardly relatively to the body portion 12, whereas the trailing prongs 14 will tend to be displaced upwardly relatively to the body portion 12, about the junctions between the angularly related prong portions 14.1 and 14.2. This effect will thus provide movement in the medium to be blended towards and away from the body portion, in addition to the movement caused by the vibration of the prongs 14 as hereinbefore described, and movement of the blender 10 as a whole.

Where the blender 10 is used for blending a liquid containing lumps, the blender 10 may be used to displace lumps against the side of a container containing the liquid so that the lumps can be broken up against the side of the container. Small lumps suspended near the surface of the liquid may be whipped with the blender 10 half immersed. Where lumps occur which do not break up in this way, they may be trapped within the interior of the blender 10, whereafter the blender 10 may be flicked rapidly back and forth until the lumps have broken up.

Where the blender 10 is used for mixing or blending, it may be displaced through the medium to be blended with a stirring action, a twitching action, a flicking action, or the like. The prongs may be scraped along the bottom of a vessel or the sides of a vessel to vary vibration.

Where the blender 10 is intended for use in whipping cream, white of egg, or the like, the blender 10 may be displaced in brisk whipping motions with the blender being lifted out of the medium being blended, during this action.

Since the blender 10 has a hollow bore extending through the blender and through the locating portion 20, cleaning of the blender 10 is readily simple.

Having now particularly described and ascertained my said invention and in what manner the same is to be performed, I declare that what I claim is:

1. A hand held and operated blender for use in blending a medium comprising
    an elongate generally cone shaped tubular body portion and a prong portion tapering outwardly from a first body portion end to a second free prong end,
    said prong portion comprising a plurality of resilient prongs uniformly spaced about and extending from said body portion,
    said prongs having at least their free end portions away from said body portion spaced uniformly from each other,
    such that said prongs flex and vibrate during use in a medium being blended,
    said prongs further being trapezoidally shaped in transverse cross-section in at least their free end portions with longer parallel side outermost and having sharpened side zones extending along the sides of their free end portions, said sharpend side edge zones tending to penetrate lumps or obstructions in the medium being blended, at least some of said prongs having prong portions being connected at an angle to each other and gradually increasing in cross-sectional area from said free end to a maximum at the juncture of said prong portions.

2. A blender according to claim 1, in which the body portion has a tapered bore for receiving a tapered spigot which is adapted to be engaged with a mechanical blender apparatus.

3. A blender according to claim 1, in which the prongs have a length of at least twice that of the body portion.

4. A blender according to claim 1, in which each prong has a length of between 30 and 50 times its width.

5. The blender of claim 1, further characterized by said prongs located to receive a vibration from one prong and transmit the vibration to at least one other of said prongs.

6. The blender of claim 1, further characterized by said prong portions together forming a unitary prong structure.